Feb. 21, 1967

A. C. MAINE ETAL
ENGINE SPEED CONTROL INCLUDING FREQUENCY
AND THROTTLE POSITION FEEDBACK 3,305,723

Filed May 1, 1964

INVENTORS
DAVID STUART TERRETT
ANTHONY CLIFFORD MAINE
DAVID JESTY STRONG

BY *Allan Ratner*

*INVENTORS*
DAVID STUART TERRETT
ANTHONY CLIFFORD MAINE
DAVID JESTY STRONG

BY Allan Ratner

United States Patent Office 3,305,723
Patented Feb. 21, 1967

3,305,723
ENGINE SPEED CONTROL INCLUDING FREQUENCY AND THROTTLE POSITION FEEDBACK
Anthony Clifford Maine, 27 Downs View Road, Hassocks, Sussex, England; David Stuart Terrett, Ruardean, Silverdale Road, Burgess Hill, Sussex, England; and David Jesty Strong, Inglenook, Warminster Road, Bath, Somerset, England
Filed May 1, 1964, Ser. No. 364,240
Claims priority, application Great Britain, May 2, 1963, 17,439/63
9 Claims. (Cl. 290—40)

This invention relates to engine speed control means and has for an object the provision of controlling the speed of a prime mover.

Prime movers have heretofore been used to drive electrical power generators and in many applications it has been required that the output of the generator be a desired frequency maintained to a high degree of accuracy. The accuracy of such output frequency is particularly required if that output is used to energize precision electrical and electronic apparatus. However, conventional speed control means or governors for prime movers or engines have heretofore not provided the high degree of accuracy of control that has been required.

Accordingly, an object of the present invention is engine speed control means for a prime mover which is capable of providing control of a high degree of accuracy.

In accordance with the present invention there is provided a control generator driven by the prime mover which produces an output frequency proportional to its speed of rotation. That signal is applied to a frequency sensitive circuit which produces a D.C. voltage proportional to the speed of the prime mover with respect to a desired reference speed. In response to that D.C. voltage a fuel valve is moved to bring the speed of the prime mover to a desired value.

In a preferred form of the invention there is provided a tachometer generator driven by the prime mover or engine, which produces an output frequency which is proportional to its speed of rotation. The output of the tachometer generator is applied to the frequency sensitive circuit comprising a filter circuit coupled to resistance means and capacitor means. The capacitor means provides a signal equal in magnitude to a signal produced by the resistance means, for a zero difference signal, when the tachometer generator produces a predetermined frequency indicating that the engine is rotating at its desired reference speed. However, when the engine changes from its desired speed the tachometer generator output changes in frequency to produce a D.C. difference signal. That difference signal is applied to operating means for changing the engine fuel valve setting in a direction to counteract the increase or decrease in engine speed and to bring the engine back to its desired speed.

For further objects and advantages of the invention and for a description of its operation, reference is to be had to the following detailed description taken in conjunction with the accompanying drawings in which.

Figure 1:
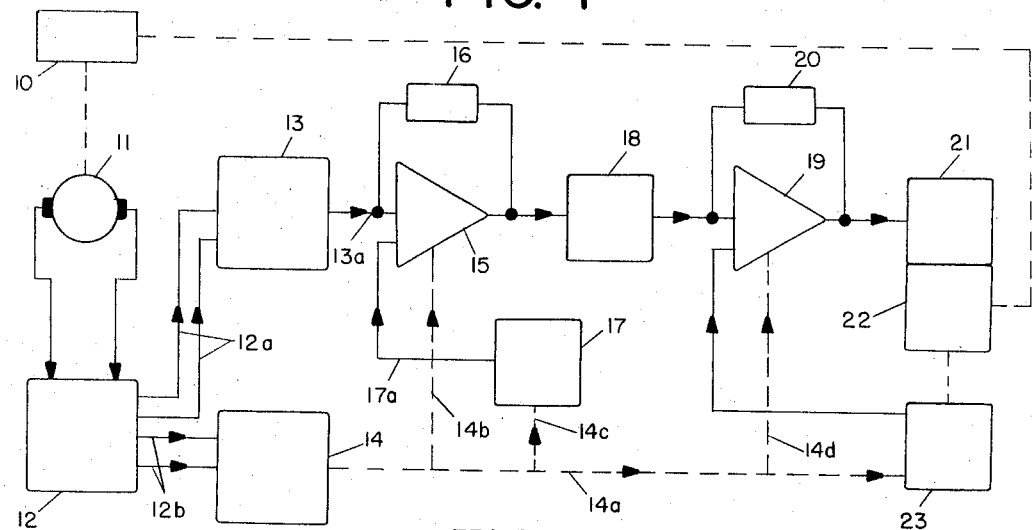
FIG. 1 is a block diagram of an engine speed governor means in accordance with the invention.

Referring now to FIG. 1 there is shown a governor system having a tachometer generator 11 connected to be driven by a steam or gas turbine engine 10 whose speed is to be governed. The tachometer generator 11 may be an A.C. generator which produces an output frequency which is proportional to its speed of rotation which is the rotational speed of the turbine engine. The output of the generator 11 is applied to a transformer 12 having two output circuits, each of which is isolated from the other. The first output circuit 12a is connected to a frequency sensitive speed sensing circuit 13 shown in more detail in FIG. 2. The second output circuit 12b is connected to a rectifier circuit 14 which acts as the power source for the remaining circuit elements of the governor system of FIG. 1. The connections from the power source to those circuit elements are shown by the dotted lines 14a–14d.

The speed-sensing circuit 13 provides a D.C. output signal which is substantially proportional to the speed of engine 10 with respect to a reference speed determined by selected circuit components of circuit 13. That is to say, circuit 13 produces a D.C. output signal which is proportional to the frequency of the signal on output 12a, the operation of which will be described later in detail. The D.C. output signal from the circuit 13 is applied by way of conductor 13a to a first chopper stabilized high-gain operational amplifier 15 having a feedback network 16 connected across the amplifier. A second input to amplifier 15 is applied by way of a conductor 17a from a conventional bias control means 14 which adds or subtracts a selected D.C. bias. In this way a signal potential may be added or subtracted from the output of the circuit 13 and in this way to adjust the speed of the turbine 10. The control means 17 comprises a potentiometer (not shown) connected across a source of supply with the movable arm thereof connected to the conductor 17a.

The D.C. output signal from the amplifier 15 is applied to a potentiometer 18, the output of which is connected to one input of a second chopper stabilized high-gain operational amplifier 19. Amplifiers 19 and 20 may be of the type described in U.S. Patent No. 3,081,435 by M. A. Miller. Amplifier 19 includes a feedback loop 20. The D.C. output from amplifier 19 is applied to a motor 21, which is mechanically connected to move a steam valve (if the engine 10 is a steam turbine) or a fuel valve (if the engine 10 is a gas turbine) to regulate the speed of engine 10. Valve 22 is mechanically connected to a conventional position reference potentiometer 23 the output of which is connected as an additional input to D.C. amplifier 19. It will be understood that a signal of given magnitude and sign applied from potentiometer 18 to the amplifier 19 causes the motor 21 to move in one direction or the other until the position of the valve 22 is such that the feedback signal from the position reference monitor 23 just balances the signal applied by the potentiometer 18. The amplifier 19 then produces a zero output signal. Thus, no further movement of the motor 21 or of the valve 22 occurs until the signal applied from the potentiometer 18 changes to a value other than zero.

Thus, in accordance with the invention a change from a desired speed of engine 10 produces a change in frequency of tachometer generator 11 which is converted to a change in a D.C. level by circuit 13, which change is then amplified by amplifiers 15 and 19 to produce an equal and opposite change in the valve 22 to bring engine 10 back to its desired speed.

The feedback loop 16 for amplifier 15 preferably includes switching means by which it can be made either reactive or nonreactive. More particularly that loop 16 comprises a resistor and capacitor (not shown) in series and a switch for bypassing the capacitor. With the feedback loop 16 nonreactive the amplifier 15 operates to provide an output signal proportional to the difference between the input signals on conductors 13a and 17a. If it be assumed that no signal is applied from control means 17 then the total signal applied to amplifier 15 is proportional to the difference between the speed of engine 10 and a reference speed, which reference speed is determined by the value of circuit elements in circuit 13. If the engine 10 is idling with its speed equal to the aforesaid reference speed the output from amplifier 15 will be zero. To keep the engine idling at this reference speed, the steam valve or fuel valve 22 must be in a particular position and the monitor 23 must be preset to provide for that position of valve 22 a zero beedback signal to amplifier 19. Thus, with both inputs to amplifier 19 having no signal applied thereto, amplifier 19 has zero output signal and thus motor 21 and valve 22 remain stationary and engine 10 idles at a constant speed, viz the reference speed.

If a load is applied to engine 10 or more particularly a load is applied to the generator which is being driven by engine 10 then that engine tends to lose speed. This loss of speed is indicated by a corresponding output signal from circuit 13 which results in a corresponding output signal from amplifier 15. The output signal from amplifier 15 is applied by way of attenuator 18 to the amplifier 19 to cause motor 21 to be driven in the required direction to move valve 22 so as to increase the power output and speed of engine 10. As well understood by those skilled in the art, the aforesaid movement of valve 22 will be insufficient to compensate completely for the increased load on engine 10. The percentage decrease in speed or "droop" on application of a given load can be regulated by adjustment on potentiometer 18. By this means the droop characteristics of engine 10 can be matched with those of another generator plant with which it may be required to act in parallel.

Two generators acting in parallel may synchronize themselves automatically thereby sharing the load in accordance with the settings of their respective steam or fuel valves. For example, if engine 10 is used to drive a generator whose output is in parallel with another whose speed is maintained constant and independent of the load, engine 10 will drive its generator at the same speed. The proportions of the total load supplied by each of the aforesaid generators will depend on the settings of their respective steam or fuel valves. In order to vary the proportions in which the load is shared the speed control 17 may be utilized. Specifically, an input signal from the control 17 is equivalent to that produced by circuit 13 in response to an error in the speed of engine 10 and has the effect of moving the steam or fuel valve 22 in one direction or another. This in turn results not in a speed change of engine 10, since its generator remains synchronized with the other generator whose speed is constant, but in a greater or lesser proportion of the load being supplied by engine 10's generator.

If engine 10 and its associated generator are not paired with another generator plant but operated alone, or if they constitute the one of two or more generator plants operating in parallel whose speed is to be governed independently, "isochronous" speed control of engine 10 may be utilized. Such isochronous speed control may be achieved by making the feedback loop 16 reactive so that it performs an integrating function well known in the art. In this isochronous condition any droop or speed overshoot which occurs on a change of loading is only temporary since the steam or fuel valve 22 is moved to restore the initial or desired speed.

As described above the characteristics of engine 10 may be varied by means of the potentiometer 18. The response times of the valve 22 and engine 10 to settle at its changed speed when the governor is in the droop condition or to recover to its initial speed when the governor is in its isochronous condition may be determined by suitable design in component values for the feedback loops 16 and 20. By this means the governor can be adapted to use with a variety of engines with different characteristics. Two engines of different kinds, at least one of which is governed by a suitably adjusted governor of FIG. 1 may be used to drive two generators operating in parallel.

Figure 2:
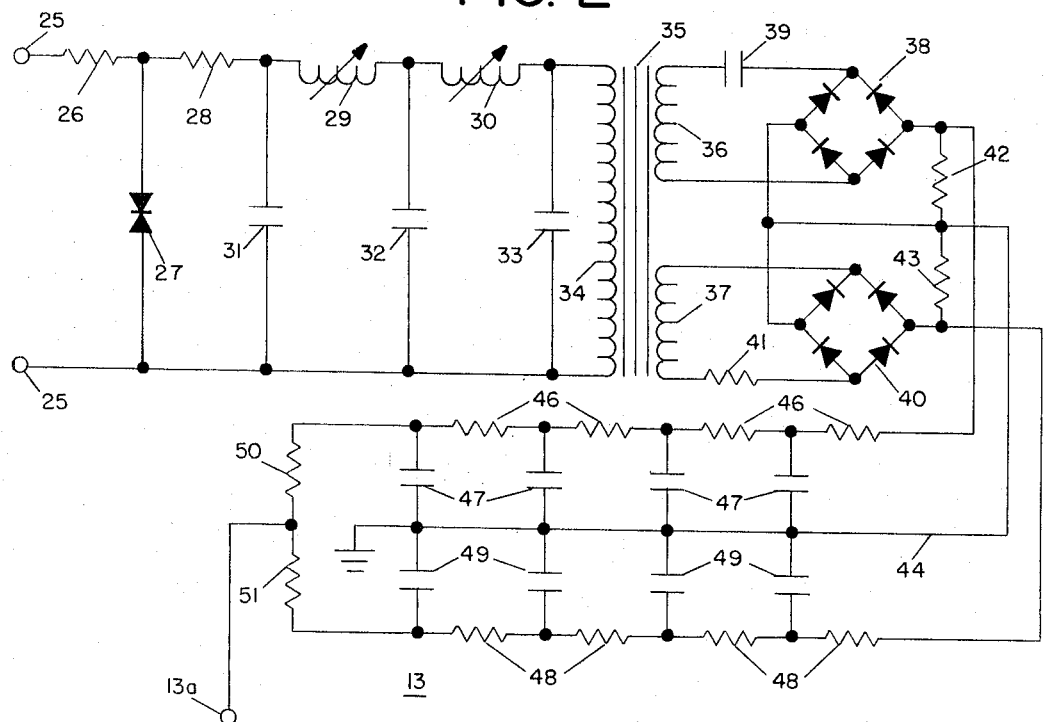
FIG. 2 is a circuit diagram of a speed sensing circuit of FIG. 1.

Referring now to FIG. 2 there is shown in more detail the speed sensing circuit 13 of FIG. 1. Circuit 13 comprises a pair of input terminals 25 which are connected to the output 12a of transformer 12. The upper terminal 25 is connected by way of an input resistor 26 to one side of a voltage limiting device 27, such as a pair of zener diodes. The other side of device 27 is connected to the lower input 25 so that the device 27 "clips" the applied voltage to provide pulses of constant amplitude regardless of the amplitude of the A.C. voltage applied by way of conductors 12A. The clipped pulses are applied through a resistor 28 to a filter circuit comprising conductors 29 and 30 and capacitors 31–33. Capacitors 31–33 and conductors 29 and 30 are selected so that the filter circuit passes a fundamental frequency $f$ which corresponds to a desired normal runnnig speed of the engine 10 and the neighboring frequencies but blocks any harmonics thereof. The frequency $f$ and substantially similar frequencies are applied at a substantially constant amplitude to the primary winding 34 of a transformer 36 having two identical secondary windings 36 and 37. The upper end of secondary winding 36 is connected by way of capacitor 39 to one side of a retifier bridge 38 the other side thereof being returned to the lower end of winding 36. The secondary winding 37 has its upper end connected to one side of a rectifier bridge 40 and its lower end connected by way of a resistor 41 to the other side of bridge 40. Bridge 40 is of reverse polarity to bridge 38 and across the output sides of bridges 38 and 40 are two equal load resistors 42 and 43 respectively. The negative end of one of the bridges and the positive end of the other are connected to a reference line 44 and to ground or a reference potential.

The pulsating D.C. voltage appearing across load resistor 42 is smoothed by a filter comprising series resistors 46 and capacitors 47 connected between junctions of the resistors 46 and ground. In similar manner the pulsating D.C. voltage appearing across load resistor 43 is smoothed by a filter comprising series resistors 48 and capacitors 49 connected between the junctions of resistors 48 and ground. Two smoothed voltages are applied across two equal resistors 50 and 51 connected in series. The junction of resistors 50 and 51 is connected to output terminal 13a which as shown in FIG. 1 is connected to an input of amplifier 15. As it will now be understood that in the absence of any input signal from control means 17 the output of amplifier 15 will be proportional to the difference between the currents flowing in resistors 50 and 51.

Capacitor 39 and resistor 41 are selected to be of values such that, at the frequency $f$, the load on the secondary winding 36 and 37 are equal. Thus the currents flowing through the two bridges 38 and 40 and the pulsating voltages appearing across resistors 42 and 43 are also equal. In similar manner the two smoothed voltages applied across resistors 50 and 51 will also be equal and opposite in polarity. As a result there will be produced zero difference current by way of terminal 13a to amplifier 15. At frequencies higher and lower than the frequency $f$ the pulsating D.C. voltage appearing across resistor 43 remains substantially the same but the pulsating D.C. voltage across resistor 42 increases or decreases respectively. Thus, the difference current applied by way of terminal 13a becomes positive or negative respectively and provides an output signal which is negative or positive respectively and which is approximately proportional to the deviation of the input frequency from the desired frequency $f$. As previously described, the D.C. output signal from circuit 13 results in movement of the valve 22 in a direction appropriate to counteract an increase or decrease in engine speed.

As previously described the D.C. output signal applied at any given time to amplifier 15 from the circuit 13 is a measure of or corresponds to the extent to which the generator speed has departed from a desired value. The principal cause of such tendency of variation in generator speed results from variation in the power that the generator is required to supply due to variation of the load. As a result of the rotational inertia of the generator and of the driving engine a time lag occurs between the time of occurrence of a load variation and the time of occurrence of a generator speed variation. This time lag may be eliminated by applying to amplifier 15 not only an input signal from circuit 13 but also an additional input signal proportional to the rate of change of the power being taken from the generator. To meet this need there may be provided a monitoring means which measures the power output of the generator and provides as an output signal to amplifier 15 a signal proportional to the time deviation thereof averaged over several cycles of the generator output. By this means a variation of the load on the generator is effective to initiate a compensating movement of the driving engine steam or fuel valve even before any detectable variation of the generator speed has resulted.

Figure 3:
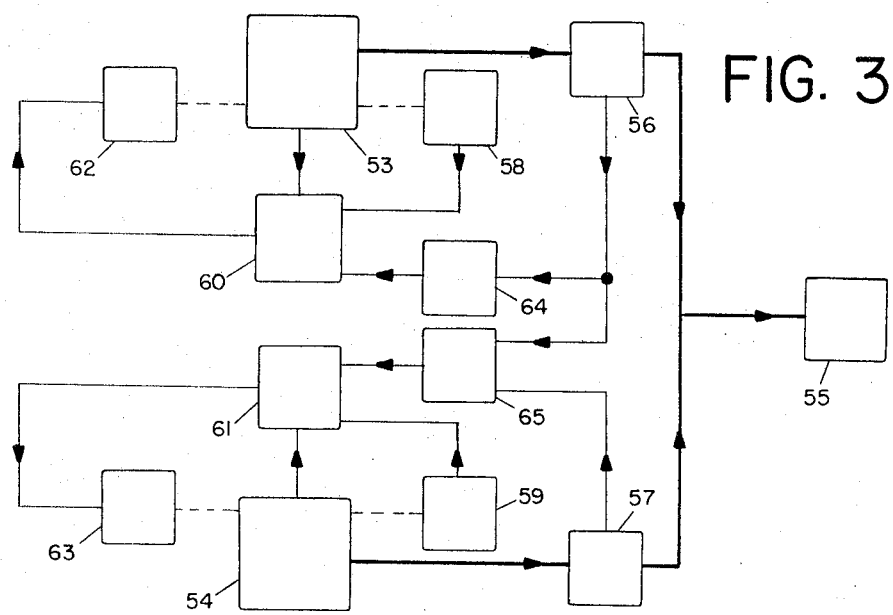
FIG. 3 is a block diagram of a generator plant comprising two generator sets, each including governor means in accordance with the invention.

The foregoing is provided in the modification of the invention shown in FIG. 3. A generator plant may comprise a pair of diesel-electric generator sets 53 and 54 for supplying a common load 55 with electrical power at a constant frequency. As understood by those skilled in the art, each generator set is to contribute a desired proportion of the power consumed by the load 55. There is connected to the power output of each generator set 53 and 54 a watt meter or other suitable power monitoring device 56 and 57 respectively. Each generator set is further provided with a respective speed monitoring device 58 and 59 each of which may be of the type shown in FIG. 1 and comprise an individual generator 11, transformer 12 and a speed sensing circuit 13. Thus, devices 58 and 59 each provide an output signal proportional to the departure of the generator speed from its desired value.

The output signal from the speed monitoring device 58 is applied to one input of a governor 60 which is comprised of elements 15, 16, 18, 19 and 20 of FIG. 1. The output signal from the speed monitoring device 59 is applied to one input of a governor 61 which similarly is comprised of elements 15, 16, 18, 19 and 20 of FIG. 1. The output signals from both governors 60 and 61 are applied to drive motors 62 and 63 respectively, each corresponding to the motor 21 of FIG. 1, and operating to move the steam or fuel valve of the generator sets 53 and 54 respectively. Each valve is positioned with a position monitoring means of the type described in FIG. 1 which in similar manner applies a position feedback signal to governors 60 and 61 respectively.

With the output signal from the power monitoring device 56 being applied to a conventional differentiating circuit 64 to provide an output signal proportional to the rate of change of the power output of generator set 53. The output signal from circuit 64 is applied to the second input of governor 60 which input corresponds to the control means 17 of FIG. 1. In this manner the governor 60 is set in its isochronous condition and it will be understood that in the absence of any variation of the load on the generator set 53 this generator will be maintained at a constant speed and deliver power at a constant frequency. Any change in the load which would disturb the speed of the generator set would be compensated for even in the absence of the power monitoring device 58 and circuit 64 after only a small disturbance had occurred. However, the provision of these latter elements provides for a compensatory movement of the valve which is even more rapid since it is initiated directly by the change in output power before any significant change in generator speed has occurred.

Generator 61 may be set in its non-isochronous condition and the two generator sets 53 and 54 are maintained in synchronism simply by the fact that they are connected in parallel to the common load 55. To enable the load 55 to be apportioned in a selected ratio between the two generator sets 53 and 54, there is applied to a second input of governor 61 a signal derived from the output signals of power monitoring devices 56 and 57 by a comparison circuit 65. It may be assumed for example that generator sets 53 and 54 are to supply power in the ratio of $a:b$ so that power supplied by each will be $aL$ or $bL$ respectively, where L is the total load and $a+b=1$. Thus the signals required from monitoring means 56 and 57 are $kaL$ and $kbL$ respectively. The comparison circuit 65 multiplies these signals by $1/a$ and $1/b$ respectively and derives the difference between the resultant products.

That difference signal is applied by way of an operational amplifier to governor 61 and is zero when the generator sets are supplying power in the correct ratio. On the other hand, if the generator set 54 supplies too large or too small a proportion of the total power, the output of circuit 65 varies in magnitude and direction to cause the necessary correcting movement of the valve of generator set 54.

It will now be understood that the proportion of the total power which is supplied by each generator set is regulated by adjustment of the multiplying section of the comparison circuit 65. It will also be understood that more than two generator sets may be paralleled with the power contribution of each determined in the same way. That is, one generator set has its governor set in the isochronous condition and the governor of the other generator set receives as one of its input signals a difference signal derived from the corresponding generator output and from the power output of the isochronous governed generator set.

Figure 4:
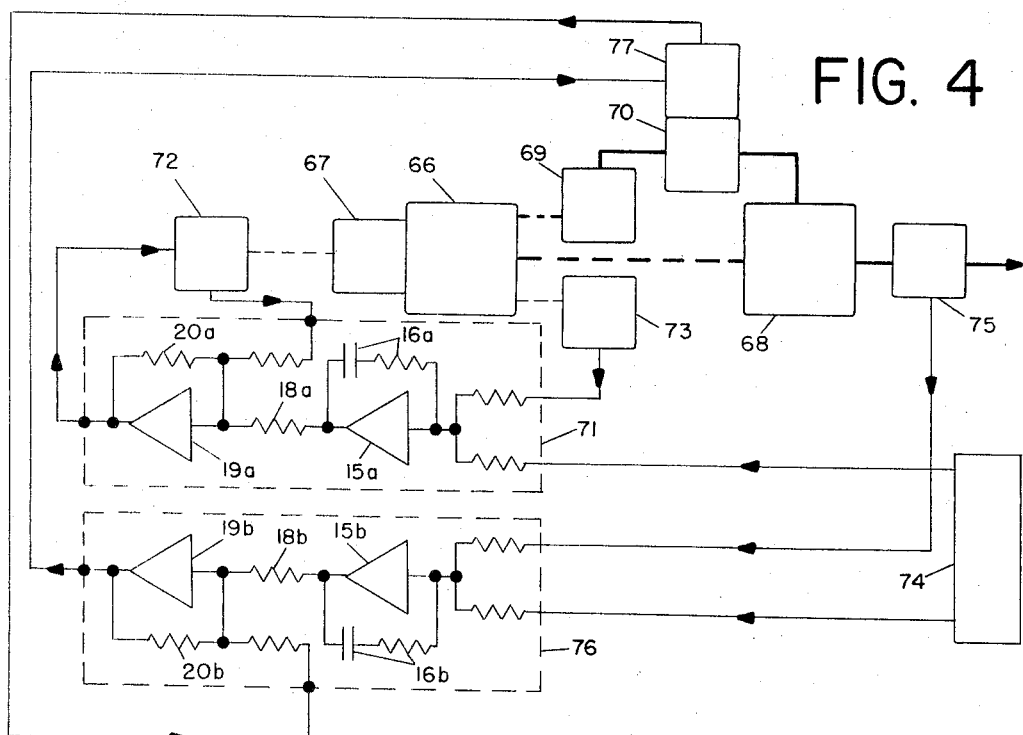
FIG. 4 is a block diagram of the power plant for a diesel electric locomotive provided with governor means in accordance with the invention.

A governor system according to the invention may also be utilized to control the power plant of a diesel electric locomotive, for example, as shown in FIG. 4. A diesel engine 66 controlled by a fuel valve 67 drives a main generator 68 whose output is applied to a traction electric motor (not shown). The diesel engine 66 also drives a pilot generator 69 whose output is applied by way of regulator means 70 to the field windings of the main generator 68. Regulator means 70 may be a variable resistor which controls the field current and thus the output power of generator 68 at any given speed of engine 66.

To control the speed of engine 66 there is provided an isochronous governor 71 including elements $15a$, $16a$, $18a$, $19a$ and $20a$, which correspond to elements 15, 16, 18, 19 and 20 of FIG. 1. The output of governor 71 is connected to a motor 72 corresponding to motor 21 of FIG. 1, which in turn operates a fuel valve 67. In accordance with the position of that valve, a feedback signal is returned to governor 71. Engine 66 drives a D.C. tachometer generator 73 which provides a signal proportional to engine speed and this signal and a speed control signal from a control unit 74 are applied as inputs to the governor 71. A watt meter 75 provides a signal proportional to the power output of the main generator 68 and this signal and a signal from the control unit 74 are applied as input signals to a power controlled circuit 76 which is identical to the circuit 71 and includes elements $15b$, $16b$, $18b$, $19b$, and $20b$. The output of circuit 76 is applied to actuate a motor 77 which operates a field current regulator means 70. In this manner a feedback signal which indicates the regulator 70 setting is applied back to the power controlled circuit 76.

As will be understood the power control signals from control unit 74 can be varied continuously over a range corresponding to a required range of output power from the main generator 68. As the power control signal is increased continuously through its range the speed control signal from control unit 74 increases stepwise and assumes successively about three or four values, each corresponding to a part of the range of the power control signal. Thus at any given setting of the power control signal, the governor 71 causes engine 66 to run in a particular one of three of four speeds. At that speed the output signal from the generator 73 will balance the speed control signal from control unit 74. At this engine and main generator speed a predetermined field current must be provided in order that the main generator output will be indicated by the power control signal which has been set. The foregoing is achieved automatically by means of the power control circuit 76. If the output from the main generator is too high or too low the signal from the watt meter 75 does not balance the power control signal from control unit 74 and circuit 76 provides an output which when applied to motor 77 moves regulator 70 in a direction to produce the required field current.

Now that the principles of the invention have been explained it will be understood that many modifications may be made all within the scope of the appended claims.

What is claimed is:

1. An engine speed control system for controlling the speed of a prime mover by adjusting valve means thereof comprising:
   a tachometer generator driven by said prime mover for producing a generated signal having an output frequency proportional to its speed of rotation,
   transformer means connected to said tachometer generator for producing a first output and a second output each isolated from each other,
   rectifier means connected to said first output for producing a bias control signal independent of frequency,
   a frequency sensitive circuit for producing a D.C. signal of magnitude and direction corresponding to the difference between the frequency of an applied signal and a reference signal,
   means connecting said second output to said frequency sensitive circuit for producing a D.C. signal corresponding to the difference between the speed of said prime mover and a reference speed,
   operating means having applied thereto said D.C. signal for operating said valve means of a respective engine in a direction to counteract an increase or a decrease in the speed of said engine from said reference speed to bring the engine back to its desired speed, said operating means including a first and a second operational amplifier each having a summing junction at substantially ground potential and an output terminal, each of said operational amplifiers including a high-gain D.C. amplifier and feedback resistor each connected between the summing junction and said output terminal and a first and a second input resistor connected to said summing junction,
   means for applying said D.C. signal to said first resistor of said first operational amplifier and for applying said bias control signal to the second of said input resistors,
   means connecting said output terminal of said first operational amplifier to said first input resistor of said second operational amplifier,
   a position reference monitor connected to said valve means for producing a feedback signal, and
   means for applying said feedback signal to said second input resistor of said second amplifier for balancing with said D.C. signal.

2. The control system of claim 1 in which said frequency sensitive circuit includes means for filtering said generated signal and applying the resultant signal to resistance means and to reactance means, and
   means for combining the signals produced by said resistance means and by said reactance means for producing said D.C. signal which is (1) of zero magnitude when said generated signal is substantially equal to said reference signal and is (2) of magnitude and direction corresponding to the difference between said generated signal and said reference signal when these signals are of different values.

3. The control system of claim 1 in which said frequency sensitive circuit includes transformer means having an input circuit and two output circuits,
   means for filtering said generated signal and applying that filtered signal to said input circuit of said transformer means,
   resistance means including a first rectifier connected to a first of said output circuits for producing a first signal,
   capacitance means including a second rectifier connected to a second of said output circuits for producing a second signal, and
   means for combining said first and second signals for producing a difference signal (1) of zero magnitude when said generated signal is substantially equal to said reference signal and (2) of magnitude and direction corresponding to the difference between said generated signal and said reference signal when these signals are of different values.

4. The control system of claim 3 in which said operating means includes potentiometer means connected in circuit with said operational amplifier for adjusting "droop" upon application of a predetermined load to said prime mover.

5. The control system of claim 4 in which said operating means includes a circuit including a potentiometer for applying a variable D.C. potential as an input to said operational amplifier for effectively changing the setting of said valve means.

6. The control system of claim 3 in which there is provided a reactive feedback loop for said operational amplifier to provide isochronous speed control for said system.

7. An engine speed control system for controlling the speed of a plurality of engines, each of which drives an individual generator by adjusting valve means for each engine thereof comprising
   a common load for said generators,
   each of said engines driving an individual tachometer generator for producing a generated signal having an output frequency proportional to the speed of rotation of its respective engine, transformer means for each tachometer generator for producing two isolated outputs, rectifier means connected to a first of said outputs for producing a bias control signal,
   a frequency sensitive circuit for each tachometer generator connected to a second of said outputs of said transformer means for producing a D.C. signal of magnitude and direction corresponding to the difference between the frequency of an applied signal and a reference signal,
   means for applying said generated signal from each said tachometer generator to its respective frequency sensitive circuit for producing a D.C. signal corresponding to the difference between the speed of its respective engine and a reference speed,
   operating means including at least one operational amplifier for each frequency sensitive circuit having applied thereto said D.C. signal for operating said valve means of a respective engine in a direction to counteract an increase or a decrease in the speed of said engine from said reference speed to bring the engine back to its desired speed, said operational amplifier comprising a summing junction at substantially ground potential and a high-gain D.C. amplifier and a feedback resistor each connected between the summing junction and an output terminal, and at least one control circuit for applying a signal to an operational amplifier for varying the proportion in which the load is shared by each of said engines.

8. The control system of claim 7 in which there is provided power monitoring means for measuring the power output of each of said generators, differentiating means for at least one of said power monitoring means to provide an output signal proportional to the rate of change of the power output thereof, means for applying said output signal from said differentiating means to its respective operating means, and a circuit for each of the remaining power monitoring means for comparing the power output of that power monitoring means and the power output of said one power monitoring means for producing a signal for application to its respective operating means.

9. The control system of claim 8 in which said operating means having applied thereto said output signal from said differentiating means includes an operational amplifier having a reactive feedback loop to set said last named operating means in its isochronous condition.

References Cited by the Examiner

UNITED STATES PATENTS

| | | |
|---|---|---|
| 2,558,729 | 7/1951 | Buechler. |
| 2,838,684 | 6/1958 | Martine _____ 290—40 |
| 2,866,150 | 12/1958 | Lewis _____ 290—40 X |
| 2,908,826 | 10/1959 | Oldenburger _____ 290—40 X |
| 2,909,779 | 10/1959 | Emery et al. _____ 290—40 X |
| 2,955,210 | 10/1960 | Dean et al. _____ 290—40 |
| 3,110,817 | 12/1963 | Frederick _____ 290—40 |

ORIS L. RADER, *Primary Examiner.*

G. SIMMONS, *Assistant Examiner.*